United States Patent [19]
Ammann

[11] 3,885,818
[45] May 27, 1975

[54] INSULATED COUPLING JOINT
[75] Inventor: Paul R. Ammann, Decatur, Ill.
[73] Assignee: Mueller Co., Decatur, Ill.
[22] Filed: Apr. 2, 1974
[21] Appl. No.: 457,355

[52] U.S. Cl. .................. 285/31; 285/47; 285/373; 285/404
[51] Int. Cl.² ........................................ F16L 58/00
[58] Field of Search ......... 285/404, 373, 53, 54, 47, 285/31

[56] References Cited
UNITED STATES PATENTS

| | | | |
|---|---|---|---|
| 2,309,253 | 1/1943 | Newell | 285/373 X |
| 3,028,180 | 4/1962 | Smith | 285/404 X |
| 3,103,887 | 9/1963 | Nepple | 285/404 X |
| 3,623,968 | 11/1971 | Bohne | 285/373 X |
| 3,650,547 | 3/1972 | Tickett | 285/373 X |

FOREIGN PATENTS OR APPLICATIONS
1,272,178  8/1961  France ................ 285/404

Primary Examiner—Thomas F. Callaghan
Attorney, Agent, or Firm—Cushman, Darby & Cushman

[57] ABSTRACT

A mechanical joint for an insulated line is disclosed which includes a joint fitting having a cylindrical passageway therethrough for receiving at least two pipes which are to be mechanically joined but electrically insulated from one another. At one end, the fitting is connected directly by a suitable mechanical means to one of the pipes which extends into the passageway. At the other end of the fitting, an annular groove is formed about the inside periphery of the fitting so that a deformable ring gasket, formed of an electrical insulating material, can be positioned in the groove between a second pipe and the fitting. A gasket follower ring is positioned next to the ring gasket in the annular groove and a means is provided for pressing the gasket follower against the ring gasket so as to deform the gasket to grip the pipe positioned within the passageway. At least one insert receiving cast groove is also formed in the fitting proximate the end of the fitting and has a relatively large opening into the passageway therethrough and has a relatively small opening to the outside periphery of the fitting. A lock insert formed of an electrical insulating material is positioned in each groove and a cup-pointed set screw is threaded therethrough from the outside of the fitting until the set screw engages the pipe to a predetermined depth, thereby locking the pipe in position with respect to the fitting.

5 Claims, 4 Drawing Figures

INSULATED COUPLING JOINT

BACKGROUND OF THE INVENTION

This invention relates to a lock insert for a mechanical joint for mechanically interconnecting at least two lines while electrically insulating the lines from one another.

Techniques for coupling two lines mechanically to one another so that fluid can be conducted through one line into the other are well known in the art. Thus, for example, Buchanan U.S. Pat. No. 2,388,117 discloses a rather simple pipe coupler having an internally threaded portion into which is threaded the end of a first pipe. A second pipe is inserted into an internal passageway in the coupler and is fixed with respect to the coupler and the first pipe by means of a cuppointed set screw. A second, somewhat more complex coupling device is disclosed in Beatty U.S. Pat. No. 2,822,192 wherein a sleeve is positioned over the ends of two pipes which are to be connected. The sleeve is fixed to one of the pipes by means of a plurality of pointed set screws. Intermediate the ends of the coupling device is an annular cavity in which is positioned a tube which is inflatable. When the tube is inflated it bears against at least one of the two pipes being connected to prevent fluid from passing along the outside periphery of the pipe from one pipe to the other. Neither of these devices discloses a mechanical coupling apparatus for joining two pipes wherein the pipes are insulated from one another to inhibit electrical currents from passing along a surface of the pipes to thereby provide cathodic protection for the pipes.

In the past, pipes have been mechanically coupled but electrically insulated from one another by means of a joint fitting wherein the fitting is directly connected to one of the pipes and is secured to the other pipe through an insulating means. Typically, the connection between the fitting and the pipe which is insulated from the fitting is effected by positioning an insulating sleeve about the pipe over the portion thereof inserted into the fitting. An expansible gasket is positioned about the pipe between the pipe and the fitting. This gasket is expanded in a radial direction so as to grip the pipe so that the pipe cannot be easily moved with respect to the fitting. However, because the only force holding the insulated pipe in position with respect to the fitting is the friction force generated by the deformable gasket positioned about the pipe within the fitting, such coupling devices have been less than successful in maintaining a strong and reliable coupling of two pipes over an extended period of time.

It therefore is an object of this invention to provide an improved coupling means for joining two lines together wherein the lines are electrically insulated from one another.

SHORT STATEMENT OF THE INVENTION

Accordingly, this invention relates to a device for mechanically coupling at least two lines or pipes to one another wherein the coupling includes at least one cylindrical passageway therethrough for receiving the pipes to be mechanically joined together but electrically insulated from one another. A first pipe is inserted into the passageway at one end of the coupling and is mechanically and electrically secured thereto by any suitable means known in the art, such as for example, set screws. At the other end of the coupling, an annular groove is formed about the internal periphery of the coupling into which is positioned a deformable gasket formed of an insulating material. Next to the gasket is positioned a gasket follower which is also formed of an insulating material. At least one lock insert groove is also formed proximate the end of the fitting which has a relatively large opening into the internal passageway of the fitting and a relatively small opening to the external surface of the fitting. A lock insert is positioned in the groove and a cup-pointed set screw is threaded therethrough. An insulating sleeve is positioned about the internal periphery of the coupling so that it insulates a second pipe from the coupling. The set screw is tightened against the insulating sleeve and the pipe so that the set screw bights into the second pipe. In addition, the ring gasket is deformed so that it presses against the pipe to thereby provide two independent means for retaining the pipe with respect to the fitting.

BRIEF DESCRIPTION OF THE DRAWINGS

Other objects, features and advantages of the present invention will become more fully apparent from the following detailed description, appended claims and the accompanying drawings, in which:

DETAILED DESCRIPTION OF THE PREFERRED EMBODIMENT

By way of example, the preferred embodiment of the present invention will be described in connection with an insulated line stopper fitting. However, it should be understood that the invention can be utilized in connection with any pipe coupling device wherein at least two pipes are mechanically coupled but electrically insulated from one another.

Figure 1:
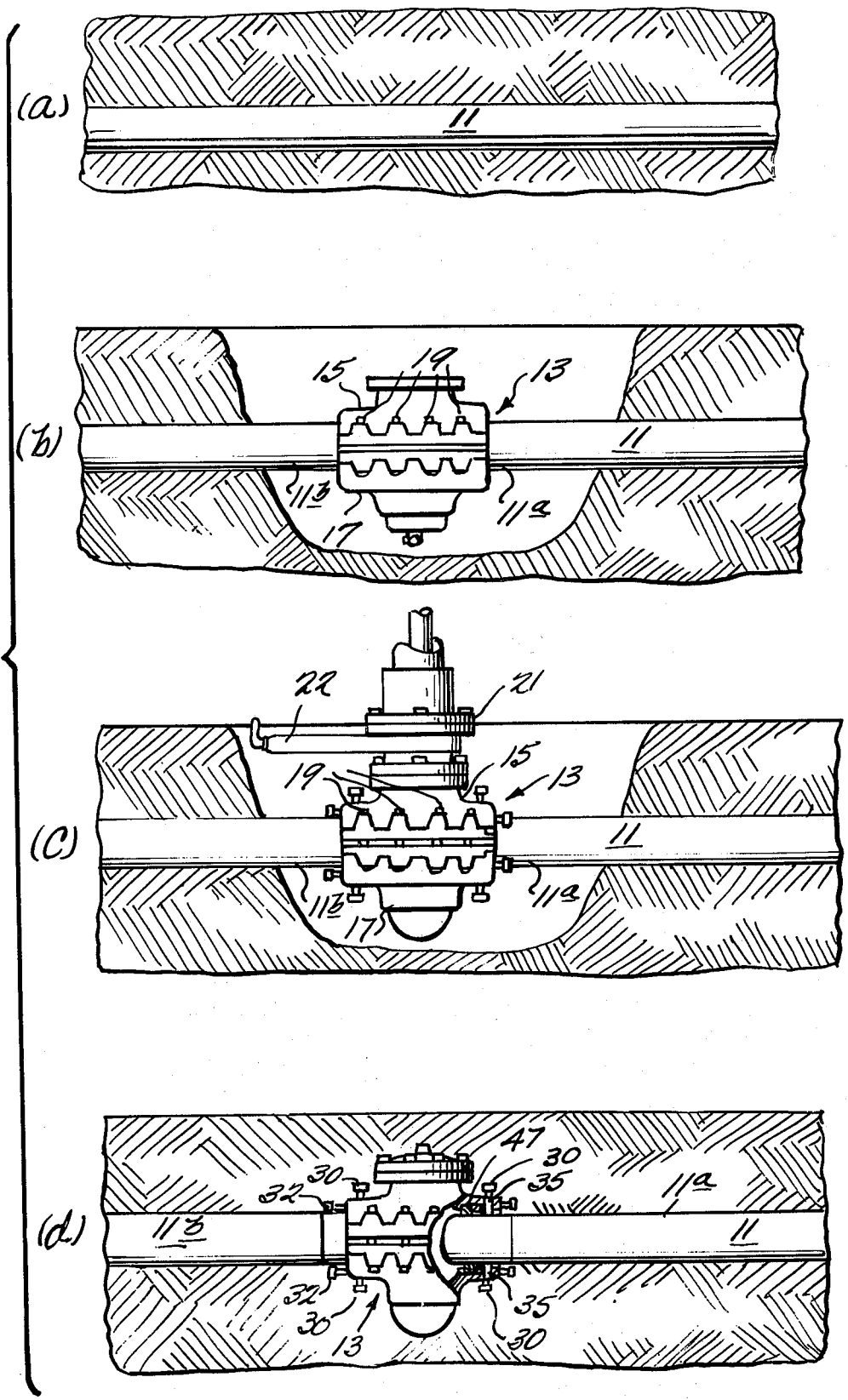
FIG. 1 is a series of schematic illustrations of how an insulated line stopper fitting is installed in accordance with the present invention.

Refer now to FIG. 1a where there is disclosed a cast iron or steel line of pipe 11 which is buried under ground and which carries a fluid such as water or gas to an approproriate destination. The line as illustrated is long and, as is well known in the art, is subject to electrical surface currents which promote corrosion of the pipe. It therefore is desirable to electrically separate or break the continuity of the pipe for reasons of cathodic protection. In addition to providing cathodic protection, it may be desirable to provide a means for tapping into the line for conducting the fluid to an alternate destination.

Accordingly, as illustrated in FIG. 1b, a cast iron insulated line stopper fitting 13 is positioned about the steel or cast iron pipe 11. The fitting is formed in two sections, an upper section 15 and a lower section 17 which are joined together by a plurality of nuts and bolts 19. As will be better understood from the description of FIGS. 2–4, the portion 11a of pipe 11 is to be electrically insulated from portion 11b and the fitting 13.

Refer now to FIG. 1c where a device 21 for tapping and cutting into the pipe 11 is schematically illustrated as being connected to the fitting 13. Devices for tapping and cutting pipes in situ are well known in the art and accordingly will not be illustrated herein in detail. Such devices include a valve 22 through which a pipe cutter passes to cut through the pipe 11 so as to sever the portion 11a thereof from 11b. With the pipes 11a and 11b separated from one another, they are maintained mechanically connected by means of the insulated line stopper fitting 13. After the pipe has been cut, a cap is secured to the fitting and the fitting is covered over and buried as illustrated in FIG. 1d. As illustrated in this figure, the fitting is shown cut-away at the insulated end thereof to show schematically a deformable gasket 49 and at least one lock insert 35 formed of an insulating material and having a cup-pointed set screw 30 threaded therethrough. The deformable gasket is expanded in the radial direction to grip the pipe 11a so that the pipe does not move with respect to the fitting. In accordance with the present invention, the set screw 30 is threaded through the lock insert until it bites into the pipe a predetermined amount. Hence, a positive means is provided for engaging and retaining the pipe 11a in the fitting 13. At the non-insulated end of the fitting, radially directed set screws 30 directly bite into the pipe 11b while longitudinally directed set screws 32 compress and hence deform a second deformable ring gasket (not shown).

Figure 2:
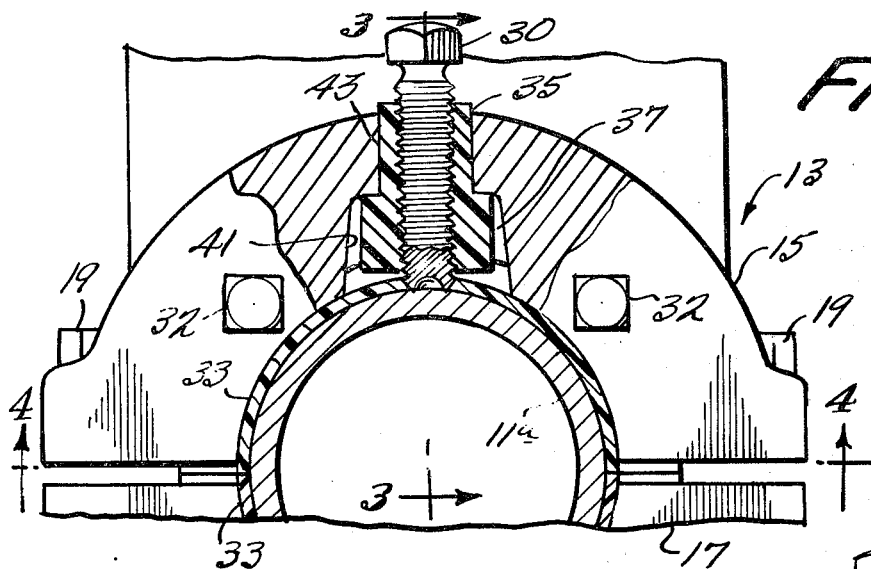
FIG. 2 is a fragmentary vertical elevation view shown in partial cutaway of the line coupling device of the present invention.

Refer now to FIG. 2 where there is illustrated a fragmentary vertical elevation shown in partial cutaway of the line coupling device in which the lock insert of the present invention is shown. The fitting 13 includes an upper section 15 and a lower section 17. The lower section 17 has a side gasket groove (not shown) extending longitudinally on each side of the fitting and a rubber insulating gasket (also not shown) is positioned in each groove. The upper portion of the fitting 13 is secured to the lower portion thereof by means of a plurality of bolts 19. A plastic insulator sleeve 33 is shown positioned in the passageway defined by the fitting such that it completely surrounds the portion of the pipe 11a which is positioned within the fitting. The insulator sleeve 33 is in two semicylindrical portions so that the sleeve can be positioned about the pipe when the pipe is in position. A lock insert 35, formed preferably of a plastic material such as Nylon Zytel 101, is positioned within a lock insert groove 37. The lock insert is preferably formed with a narrow upper portion and a relatively wide lower portion 41 so that the lock insert cannot be removed from the fitting by a force exerted on the insert in an outward radial direction. In addition, the lock insert is preferably of a square shape or other non-circular shape so that the insert will be keyed in the hole 43 provided through the upper portion 15 of the fitting. This prevents the lock insert from rotating with the cup-pointed set screw 30 when the set screw is rotated to engage the pipe 11. In order to facilitate the handling of the fitting, the lock insert is preferably press fit into the hole 43 so that it does not fall inwardly into the central passageway during assembly of the fitting about the pipe.

Figure 3:
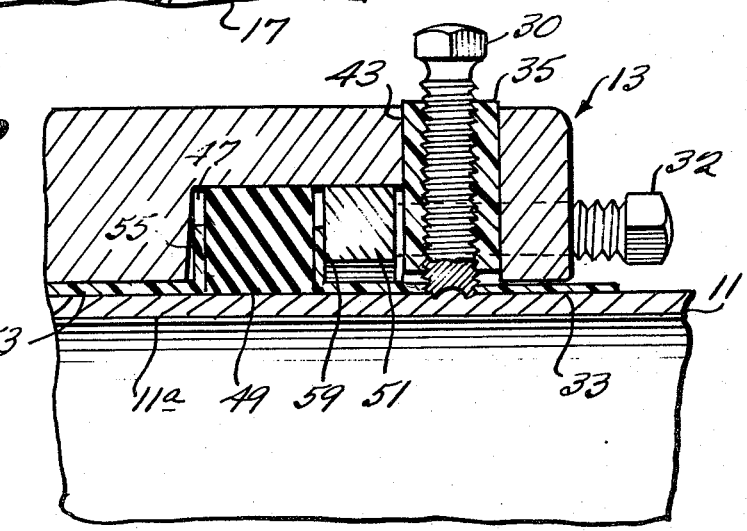
FIG. 3 is a partial section view taken along the lines 3—3 of FIG. 2 showing the lock insert of the present invention.

Refer now to FIG. 3 where there is disclosed a partial section view taken along the line 3—3 of FIG. 2 which illustrates the lock insert of the present invention. The portion of the pipe 11 which is to be electrically insulated is shown positioned within the central passageway of the fitting 13. An annular groove 47 is shown formed in the fitting so as to accommodate a deformable gasket 49 and a gasket follower ring 51. The gasket 49 is formed of an electrical insulating material. In addition, to provide insulation of the cast iron or steel pipe 11 from the fitting, a forward insulating sleeve 53 formed of a plastic material is provided which extends about the inside periphery of the fitting which defines the passageway. The sleeve, as in the case of sleeve 33, includes two separate portions so that the sleeve can be positioned about the pipe. The insulating sleeve 53 is terminated in a flange portion 55 in order to insure that the pipe does not make electrical contact with the fitting 13 at the junction of the fitting passageway and the annular groove 47 and in addition to prevent the sleeve from moving longitudinally along the pipe. The annular gasket ring 49 is positioned next to the flange portion of the insulating sleeve 53 and the other insulating sleeve 33 is positioned with its annular flange portion 59 abutting the deformable annular gasket 49. The flange portion 59 of the sleeve 33 prevents the sleeve 33 from moving along the pipe in a longitudinal direction except under the force of the set screws 32 which force the gasket follower 51 to the left. The sleeve 33 extends slightly past the end of the fitting so as to insure that the pipe 11 does not make electrical contact with the fitting due to ground movements. The gasket follower ring 51 which preferably is of a material which is not easily deformed is then positioned next to the flange portion of the insulating sleeve 33. The gasket follower 51 is pressed against the gasket 49 by means of a plurality of set screws 32 which are threaded into the fitting from the end thereof. Thus, when the set screws are tightened to move the gasket follower 51 to the left, the end gasket 49 deforms so as to expand in the radial direction thereby gripping the surface of the pipe 11 to inhibit movement of the pipe 11 with respect to the fitting.

One of the inserts 35 is illustrated having a cup-shaped pointed set screw 30 threaded therethrough. As illustrated, the lock insert fits with a press fit in the hole 43 connecting the cast insert receiving groove with the external periphery of the fitting, thereby preventing the lock insert from falling into the internal passageway of the fitting before the fitting is positioned about the steel or cast iron pipe 11. In practice, two or more lock inserts are provided in order to more uniformly distribute the retaining force provided by each set screw and to increase the pull out resistance provided by the fitting.

After the upper and lower portions of the fitting have been positioned about the pipe 11 with the insulator sleeves 33 and 53 and the lock inserts 35 positioned about the pipe at the portion of the pipe to be insulated, the nuts and bolts 19 are tightened to thereby provide a fluid tight seal along the longitudinal length of the pipe. The set screws 32 are then tightened to cause the gasket 49 to tighten about the pipe. After the set screws 32 have been tightened, the set screws 30 are turned so that they are threaded in the lock inserts toward the pipe. The cup-pointed ends of the set screws shown in the partial cut-away of FIG. 2 bite into the insulator 33, thereby cutting out a tiny coupon in the insulator and in addition, bight into the cast iron or steel pipe. In the preferred embodiment, if 175 inch-pounds torque is applied to the set screw 30, the set screw will cut into the steel pipe to a depth of 0.025 inch. It has been determined experimentally that the additional pull-out resistance provided by the lock insert, including the set screw 30, is 4300 pounds when two lock inserts are utilized and 7300 pounds when four lock inserts are utilized about the periphery of the fitting.

Figure 4:
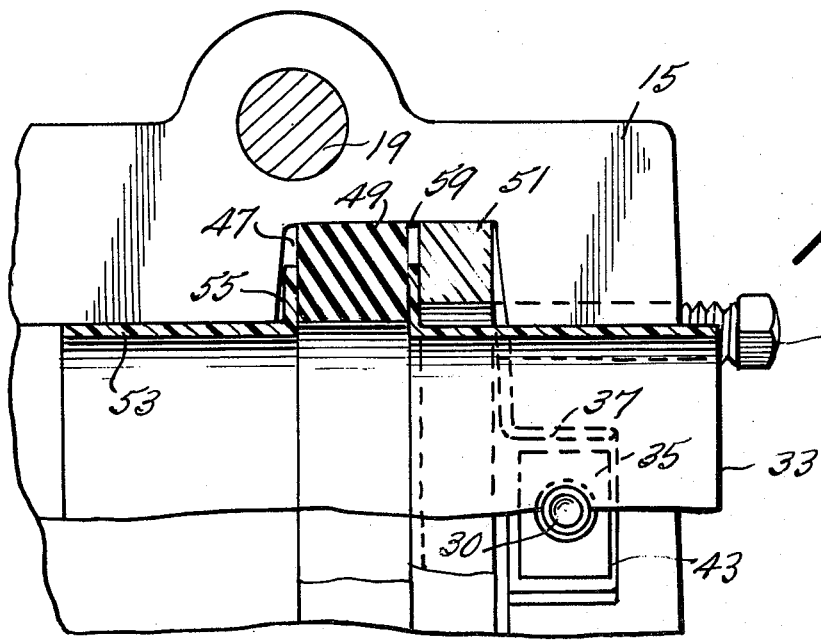
FIG. 4 is a section view taken along the lines 4—4 of FIG. 2 showing an end view of the lock insert of the present invention.

Refer now to FIG. 4 which is a partial section view taken along the lines 4—4 of FIG. 2. As illustrated, the fitting includes a first annular groove 47 extending about the internal periphery of the central passageway. Into this annular groove is positioned the gasket ring 49 and the gasket follower ring 51 together with insulating sleeves 33 and 53. In addition, a cast lock insert groove 37 is formed in the inside periphery of the fitting which groove terminates in a hole 43 which extends to the external periphery of the fitting. The lock insert 35 is illustrated positioned in the cast groove and a cup-pointed set screw is shown threaded through the lock insert for engaging with the pipe, not shown. It should be noted that the insulating sleeve 33 extends partially past the end of the fitting in order to provide added insulating protection between the fitting and the pipe.

While the lock insert arrangement of the present invention has been shown in connection with a mechanical joint fitting, it should be understood that the insulating and retaining apparatus of the present invention could be utilized in conjunction with any device for coupling two electrically conductive pipes for the transmission of fluid therethrough.

While the present invention has been disclosed in connection with the preferred embodiment, it is to be understood that there may be other obvious variants of the present invention that will fall within the spirit and scope of the invention as defined by the appended claims.

What is claimed is:

1. An insulated coupling joint comprising:
   a fitting for mechanically connecting at least two pipes wherein said pipes are electrically insulated from one another, said fitting having at least one cylindrical pipe receiving passageway therethrough, an annular groove extending about the internal periphery of a first end thereof, and at least one insert receiving hole proximate said first end of said passageway, said hole extending radially from said passageway to the outside periphery of said fitting,
   a deformable gasket formed of an electrical insulating material positioned in said annular groove,
   a lock insert positioned in each of said insert receiving holes, said lock insert being an electrical insulator and having a threaded hole therethrough,
   means for inhibiting the rotation of said lock insert with respect to said fitting,
   means for preventing the radial movement of said lock insert with respect to said hole,
   a set screw threaded through said lock insert, and
   an insulator sleeve positioned about the portion of a pipe which extends into said first end of said passageway of said fitting, said set screw being threaded until the end thereof cuts through said insulator and into said pipe to a predetermined level,
   means for deforming said gasket in a radial direction to thereby cause said gasket to grip and retain said pipe, and
   means for securing the other end of said fitting to a pipe which extends into the passageway at said other end of said fitting.

2. The insulated coupling joint of claim 1 wherein said means for preventing the radial movement of said lock insert with respect to said insert receiving hole comprises said insert receiving hole having a larger opening into said cylindrical passageway than the opening to the outside periphery of said fitting, and said lock insert having a relatively large base portion and a relatively small outer end portion wherein said outer end portion communicates with said hole at the external periphery of said fitting and said base portion is positioned in said insert receiving hole proximate said cylindrical passageway.

3. The insulated coupling joint of claim 2 wherein said lock insert includes a base portion and a neck portion, said neck portion extending through said insert receiving hole in said fitting to the outside periphery thereof and said base portion being positioned in said insert receiving hole proximate the cylindrical passageway through said fitting.

4. The insulated coupling joint of claim 2 wherein said means for inhibiting the rotation of said lock insert with respect to said fitting includes said insert receiving hole through said fitting being non-cylindrical and said lock insert having an external configuration which mates with said insert receiving hole through said fitting.

5. The insulated coupling joint of claim 1 wherein said set screws have a cup-pointed end.

* * * * *